United States Patent
Schreiber et al.

(10) Patent No.: US 9,751,496 B2
(45) Date of Patent: Sep. 5, 2017

(54) SEAT BELT TENSIONER FOR A VEHICLE PASSENGER RESTRAINT SYSTEM

(71) Applicant: TRW Automotive GmbH, Alfdorf (DE)

(72) Inventors: Simon Schreiber, Mutlangen (DE); Thomas Moedinger, Alfdorf (DE); Alex Waidmann, Heuchlingen (DE); Karl-Heinz Köeppel, Waldstetten (DE); Markus Peters, Iggingen (DE)

(73) Assignee: TRW Automotive GmbH (DE)

( * ) Notice: Subject to any disclaimer, the term of this patent is extended or adjusted under 35 U.S.C. 154(b) by 0 days.

(21) Appl. No.: 14/441,629

(22) PCT Filed: Nov. 25, 2013

(86) PCT No.: PCT/EP2013/003549
§ 371 (c)(1),
(2) Date: May 8, 2015

(87) PCT Pub. No.: WO2014/079587
PCT Pub. Date: May 30, 2014

(65) Prior Publication Data
US 2015/0274123 A1    Oct. 1, 2015

(30) Foreign Application Priority Data
Nov. 26, 2012 (DE) .................. 10 2012 023 031

(51) Int. Cl.
*B60R 22/195* (2006.01)
*F15B 15/19* (2006.01)
*B60R 22/46* (2006.01)

(52) U.S. Cl.
CPC ...... *B60R 22/4628* (2013.01); *B60R 22/1954* (2013.01); *F15B 15/19* (2013.01)

(58) Field of Classification Search
CPC ............ B60R 22/4628; B60R 22/4633; B60R 22/195; B60R 22/1954; B60R 22/1955; B60R 22/46; F15B 15/19
(Continued)

(56) References Cited

U.S. PATENT DOCUMENTS 4,734,265 A    3/1988 Nilsson et al.
5,000,479 A    3/1991 Werner et al.
(Continued)

FOREIGN PATENT DOCUMENTS

DE    2506679    8/1976
DE    3425836    1/1986
(Continued)

OTHER PUBLICATIONS

Wikipedia entry for "friction welding", Jun. 15, 2016, https://en.wikipedia.org/wiki/Friction_welding.*

*Primary Examiner* — Keith J Frisby
(74) *Attorney, Agent, or Firm* — Tarolli, Sundheim, Covell & Tummino LLP

(57) ABSTRACT

A belt tensioner (10) for a vehicle occupant restraint system comprises a tube (12) containing gas in the trigger case and an igniter unit (14) arranged in the tube (12) which igniter unit is inserted in an open end face (16) of the tube (12) and includes a base (18) and a cap (20) fastened to the base (18) for accommodating a propelling charge, wherein the cap (20) is arranged at least pertly inside the tube. The igniter unit (14) is welded to the tube (12).

11 Claims, 2 Drawing Sheets

(58) Field of Classification Search
USPC .................. 280/806; 102/530, 531; 297/480; 60/632
See application file for complete search history.

(56) References Cited

U.S. PATENT DOCUMENTS

| | | | |
|---|---|---|---|
| 5,615,912 A * | 4/1997 | O'Loughlin et al. | B60R 21/272 102/531 |
| 2001/0035472 A1 | 11/2001 | Hamaue et al. | |
| 2002/0084010 A1 * | 7/2002 | Blomquist | C06D 5/06 149/100 |
| 2002/0109029 A1 | 8/2002 | Stevens | |
| 2003/0230882 A1 * | 12/2003 | Hosey | B60R 21/272 280/737 |
| 2006/0157607 A1 | 7/2006 | Kohlndorfer et al. | |
| 2007/0096451 A1 | 5/2007 | Stevens | |

FOREIGN PATENT DOCUMENTS

| | | | |
|---|---|---|---|
| DE | 3832120 | 3/1990 | |
| DE | 1201513 | 5/2002 | |
| DE | 60115579 | 8/2006 | |
| DE | 102010051420 | 5/2012 | |
| EP | 1227016 | 7/2002 | |
| WO | 99/00275 | 1/1999 | |
| WO | WO 2007068452 A1 * | 6/2007 | ......... B60R 22/4628 |

* cited by examiner

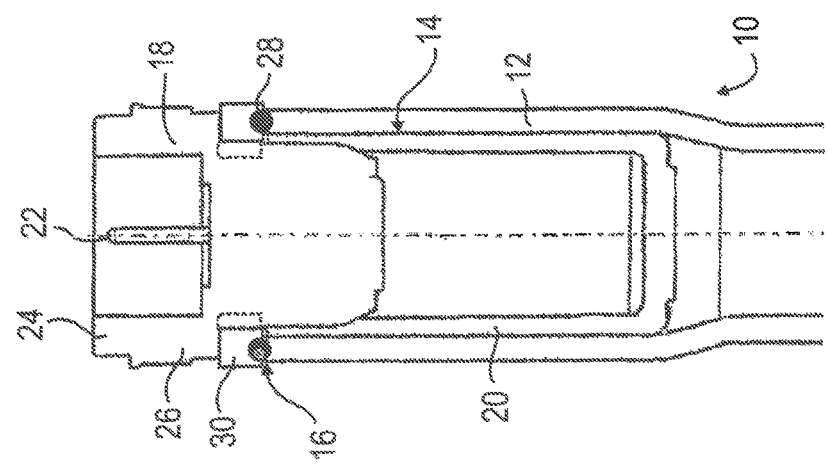
Fig. 1 — State of the Art —
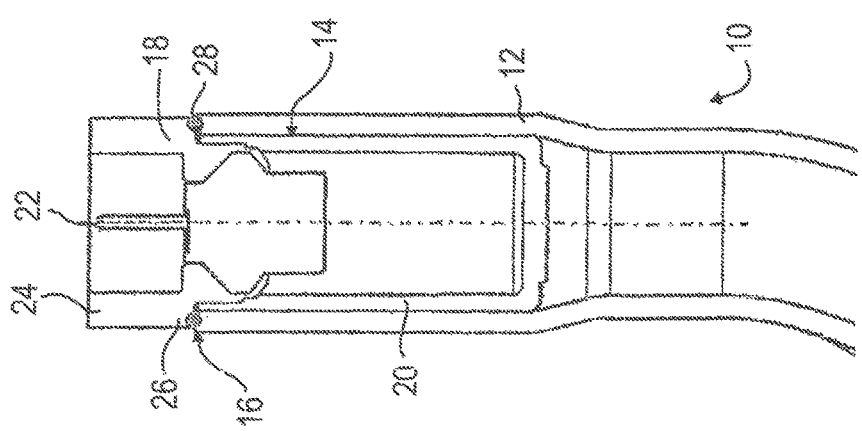
Fig. 2
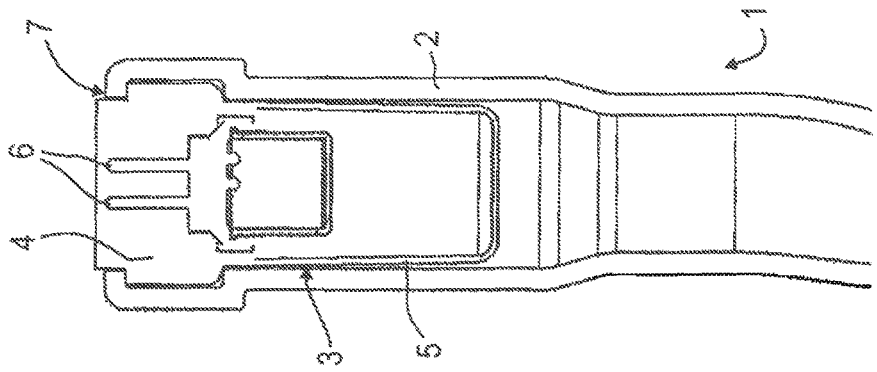
Fig. 3

SEAT BELT TENSIONER FOR A VEHICLE PASSENGER RESTRAINT SYSTEM

RELATED APPLICATIONS

This application corresponds to PCT/EP2013/003549, filed Nov. 25, 2013, which claims the benefit of German Application No. 10 2012 023 031,1, filed Nov. 26, 2012, the subject matter of which are incorporated herein by reference in their entirety.

BACKGROUND OF THE INVENTION

The invention relates to a belt tensioner for a vehicle occupant restraint system comprising a tube containing gas in the trigger case and an igniter unit arranged in the tube which is inserted in an open end face of the tube and includes a base and a cap fastened to the base for accommodating a propelling charge, the cap being arranged at least partly inside the tube.

Such belt tensioners are known. In a case of restraint the igniter unit is activated and generates a pressure gas which is forwarded in the tube and drives a turbine coupled to a shaft of a belt retractor, for example, so as to draw in a belt slack. In the case of those belt tensioners the turbine and, resp., the drive wheel is either directly pressurized by the pressure gas or one or more mass bodies provided in the tube are moved by the pressure gas in the direction of the driving wheel and load the latter. Such belt tensioners are known, for example, from DE 10 2010 051 420 A1 or U.S. 2001/0035472 A1. The igniter unit usually is a prefabricated sub-assembly which is fixed in the tube by means of a dovetail joint or screw joint.

SUMMARY OF THE INVENTION

The invention provides a belt tensioner which excels by a simple and low-cost design while ensuring high tensioning capacity.

In accordance with the invention, this is achieved in a belt tensioner of the afore-mentioned type in that the igniter unit is welded to the tube. Such welded joint is especially robust and thus ensures that the required high component strength and especially the safe connection between the tube and the igniter unit can be maintained even in the case of very dynamic pressure increase and the related higher tensioning capacity. By the configuration according to the invention, the interface between the igniter unit and the tube can be designed to be very small and cost-effective. Furthermore no complicated geometries are required at the joint. Since the manufacturing process in the case of the belt tensioner according to the invention thus is simple and robust, higher production rates are possible. Hence the configuration according to the invention offers advantages as regards space, costs, manufacture and function of the belt tensioner.

The igniter unit, is advantageously connected to the tube by friction-welding. This method excels by a high welding rate, a narrow and slim weld shape and little thermal deformation of the components involved. It is another advantage that apart from igniter units made of metal also resin-bonded igniter units can be used. It is also possible, however, to employ other suited welding methods such as laser welding or CD welding.

Preferably, the tube has the same inner diameter In the area of the base and of the cap. Hence reforming or widening of the tube, as if is required in the case of dovetailing, can be dispensed with. Thus high bursting strength can be achieved and the manufacturing process is facilitated.

In order to prevent the propelling charge from extremely heating during welding, the igniter unit is welded to the tube preferably in the area of the base.

An especially simple configuration is resulting from the fact that the igniter unit, especially the base, is welded to the end face of the tube. This area is especially easily accessible.

Alternatively or additionally, the igniter unit, especially the base, can be welded to a peripheral wall of the tube. Hence welding is carried out by the overlap method, namely from outside through the peripheral wall of the tube.

In accordance with an embodiment of the invention, the base includes a step that laterally projects from an inside of the tube. In particular, the tube is adjacent to the step with its end face. Hence the step is arranged outside the tube and the igniter unit and the tube are preferably welded in the contact area between the end face of the tube and the step.

In accordance with another embodiment, the base is arranged completely inside the tube. The igniter unit is accommodated to be especially protected in the tube, the welded joint between the igniter unit and the tube being made on the end face radially peripherally and/or through the tube material to the peripheral wall of the tube. In this way e.g. also an igniter unit sheathed by plastic injection molding can be mounted so that the interface is protected by the tube.

In particular, the base, includes on the rear side electric contacts projecting therefrom which are completely located inside the lube, wherein the ends of the contacts axially freely protruding from the base are laterally surrounded exclusively by the peripheral wall of the tube. That is to say, the igniter unit itself includes no additional outer well surrounding the electric contacts (so called pins or wires), which allows to obtain material saving and a simpler design of the base.

In order to facilitate a welded joint with a metallic tube, the base can be made of metal at least in portions.

Furthermore, if is possible to form the base of plastic material at least in portions. Especially the base in such case may include a ring of metal embedded in the plastic material which is welded to the tube. During manufacture of the base, the plastic material of the base is injection-molded around said ring.

In an especially preferred embodiment the tube then contacts the ring with its end face and the welding connection is performed in this area.

BRIEF DESCRIPTION OF THE DRAWINGS

Further features and advantages of the invention are evident from the following description of several preferred embodiments by way of the enclosed drawing in which:

FIG. 1 shows a sectional view of a tube including an igniter unit in a state-of-the-art belt tensioner;

FIG. 2 shows a sectional view of a tube including an igniter unit in a belt tensioner according to a first embodiment of the invention;

FIG. 3 shows a sectional view of a tube including an igniter unit in a belt tensioner according to a second embodiment of the invention;

DESCRIPTION OF EMBODIMENTS

Figure 4:
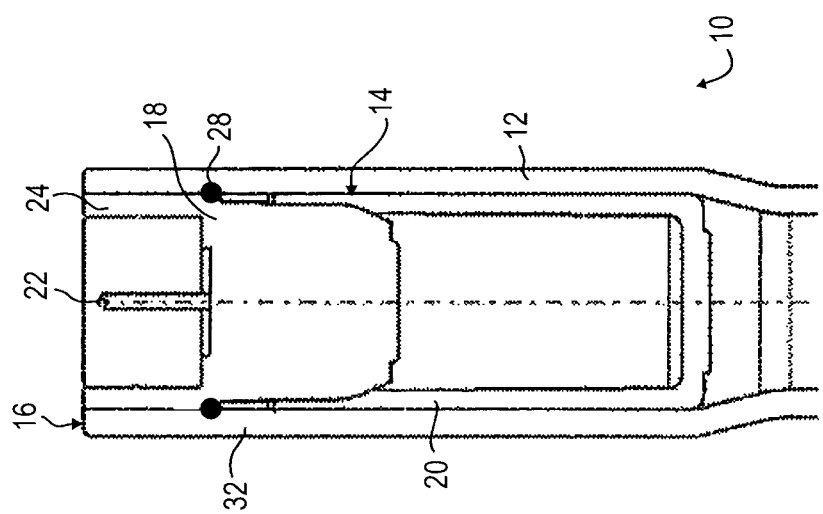
FIG. 4 shows a sectional view of a tube including an igniter unit in a belt tensioner according to a third embodiment of the invention.

FIG. 1 illustrates a belt tensioner 1 according to the state of the art which, inter alia, includes a tube 2 containing gas in a trigger case and an igniter unit 3 arranged in the tube 2. The igniter unit 3 comprises a base 4 and a cap 5 fastened to the base 4 in which cap a propelling charge is contained. Moreover, electric contacts 8 are provided in the form of pins. As is evident from FIG. 1, the tube 2 is widened toward an end face 7 so as to receive the base 4. The igniter unit 3 is retained in the tube 2 by a dovetail joint.

FIG. 2, on the other hand, illustrates a belt tensioner 10 according to a first embodiment of the invention. This belt tensioner, too, includes a tube 12 which is pressurized by pressure gas in the trigger case as well as an igniter unit 14 arranged in the tube 12 which is inserted in an end face 18 of the tube 12 open before in a way similar to the state of the art.

The igniter unit 14 equally has a base 18 and a cap 20 fastened thereto which contains the propelling charge which in the trigger case produces the pressure gas. As is evident from FIG. 2, the cap 20 contacts the tube 12 on the inside.

The base 18 includes on the rear side electric contacts 22 projecting therefrom, here in the form of pins, the axially freely protruding ends of which are laterally surrounded by a peripheral wall 24 formed by a portion of the base 18 and are protected by the same.

The igniter unit 14 is a so called prefabricated micro gas generator comprising an igniter chamber directly coupled to the electric contacts 22 and an adjacent booster chamber. Alternatively, the igniter charge and the booster charge can be arranged in a joint chamber.

The base 18 is made of metal and includes a step 26 which Is arranged axially outside the tube 12 and laterally projects from the inside of the tube 12. The tube 12 is adjacent with its end face to the step 28 and is connected thereto by laser welding. The welded Joint is denoted with 28. In this way the igniter unit 14 is reliably fixed in the tube 12 even in the trigger case.

As is evident from FIG. 2, in contrast to the state of the art the tube 12 is not widened in the area of the base 13. Thus the tube 12 the inner diameter of which is limited only by the diameter of the igniter unit 14 in the area of the cap 20 can be directly inserted after forming without any further shaping process steps having to be taken.

The belt tensioner 10 which especially is a rotatory turbine tensioner including a pressurized gas-supplying lube 12 makes use of a very dynamic pressure increase and the resulting force for the webbing draw-in. Triggering the igniter unit causes an initial pressure which is transmitted to a booster charge. Accordingly, a strong pressure gradient of several 10 MPa/ms may occur. For the loaded component parts, especially the connection between the tube 12 and the igniter unit 14, this is an extreme situation in which the especially robust welded joint shows its advantages.

Moreover, at the junction between the tube 12 and the igniter unit 14 no complicated geometries are required. Therefore the configuration according to the invention can be used flexibly as to length. The positioning of the interface is simple and safe and if is possible to minimize the configuration thereof.

FIG. 3 shows a second embodiment of the belt tensioner 10 according to the invention, wherein hereinafter equal components are provided with equal reference numerals and merely the differences from the embodiment according to FIG. 2 shall be discussed.

In the belt tensioner 10 according to FIG. 3 the base 18 of the igniter unit 14 is made of plastic material at least in portions, with a ring 30 of metal being provided which is embedded in the plastic material of the base 18, especially sheathed by plastic injection molding during manufacture. The end face 18 of the tube 12 contacts the ring 30 which has approximately the same outer diameter as the tube 12. The welding between the tube 12 and the igniter unit 14 is performed between the ring 30 and the end face 18 of the tube 12.

FIG. 4 shows a belt tensioner 10 according to a third embodiment of the invention. Again, hereinafter only the differences from the afore-described embodiments shall be discussed.

In the belt tensioner 10 according to FIG. 4 the entire igniter unit 14, especially also the base 18, is arranged completely inside the tube 12. in the area of the base 18 and of the cap 20 the tube 12 has the same inner diameter. The igniter unit 14 has a cylindrical shape; in particular the base 18 and the cap 20 have the same outer diameter which substantially corresponds to the inner diameter of the tube 12.

In this configuration the igniter unit 14, especially the base 18, is welded to the peripheral wall 32 of the tube 12. This is effectuated by radial through penetration welding in the area of the base 18 in the overlap method. The welded joint is denoted with 28 in this case, too. As a matter of course, further end-face welding between the base 18 and the end face 16 of the tube 12 is imaginable.

Figure 5:
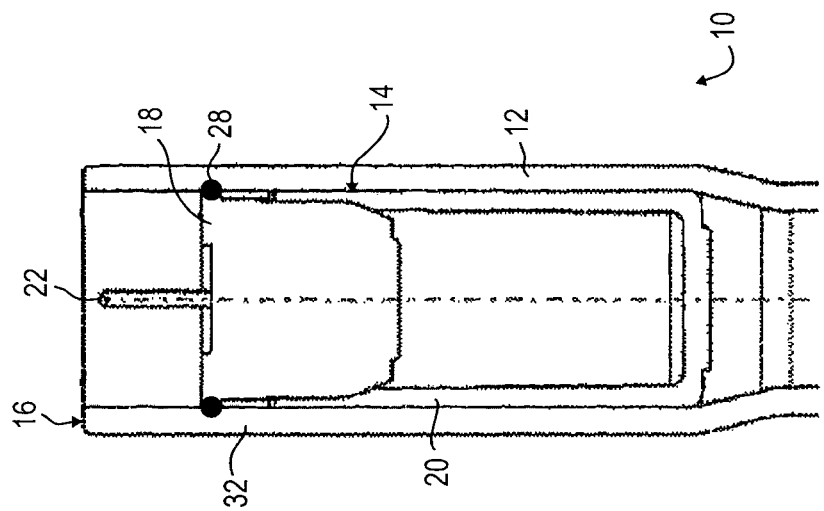
FIG. 5 shows a sectional view of a tube including an igniter unit in a belt tensioner according to a fourth embodiment of the invention.

Finally, FIG. 5 illustrates a fourth embodiment of the belt tensioner 10 according to the Invention which is very similar to that of FIG. 4. As also in the case of the belt tensioner 10 of FIG. 4, the electric contacts 22 projecting from the base 18 are located completely inside the tube 12, wherein in the configuration according to FIG. 5 the ends of the contacts 22 axially freely protruding from the base 18 are laterally surrounded exclusively by the peripheral wall 32 of the tube 12. Consequently, no peripheral wall 24 surrounding the electric contacts 22 is provided at the base 18. This results in a facilitated design of the base 18 with the contacts 22 being equally well protected by the peripheral wail 32 of the tube 12.

The invention claimed is:

1. A belt tensioner for a vehicle occupant restraint system, comprising:
   an igniter unit including an at least partly plastic base and a cap fastened to the base, the can accommodating a propelling charge for producing a pressurized gas;
   a metal ring embedded in a plastic part of the base; and
   a tube for forwarding the pressurized gas produced by the propelling charge, the ring being welded to the tube to secure the igniter unit to the tube.

2. The belt tensioner according to claim 1, wherein the cap is arraigned at least partly inside the tube.

3. The belt tensioner according to claim 1, wherein the base includes a step that extends redialiy outward beyond an inner diameter of the tube.

4. The belt tensioner according to claim 3, wherein the ring is adjacent the step.

5. The belt tensioner according to claim 3, wherein the ring is disposed between an open end face of the tube and the step.

6. The belt tensioner according to claim 1, wherein the metal ring is welded to the tube by frition welding.

7. The belt tensioner according to claim 1, wherein the metal ring is welded to an open end face of the tube.

8. The belt. tensioner according to claim 1, wherein the base is at least partly metal.

9. The belt tensioner according to claim 1 comprising electrical contacts projecting from a rear side of the base.

10. The belt tensioner according to claim 9, wherein the electrical contacts have ends that axially protrude from the base, the ends being laterally surrounded by a peripheral wail formed by a portion of the base.

11. the belt tensioner according to claim 1, wherein an outer diameter of the ring is substantially equal to and outer diameter of the tube.

\* \* \* \* \*

UNITED STATES PATENT AND TRADEMARK OFFICE
CERTIFICATE OF CORRECTION

| | | |
|---|---|---|
| PATENT NO. | : 9,751,496 B2 | Page 1 of 1 |
| APPLICATION NO. | : 14/441629 | |
| DATED | : September 5, 2017 | |
| INVENTOR(S) | : Simon Schreiber et al. | |

It is certified that error appears in the above-identified patent and that said Letters Patent is hereby corrected as shown below:

In the Claims

Column 4, Line 50 reads "can" should read --cap--

Column 4, Line 57 reads "arraigned" should read --arranged--

Column 4, Line 59 reads "redialiy" should read --radially--

Column 4, Line 67 reads "frition" should read --friction--

Column 5, Line 10 reads "wail" should read --wall--

Column 5, Line 12 reads "and" should read --an--

Signed and Sealed this
Tenth Day of October, 2017

Joseph Matal
*Performing the Functions and Duties of the*
*Under Secretary of Commerce for Intellectual Property and*
*Director of the United States Patent and Trademark Office*